May 23, 1967 S. F. JOHNSON 3,321,232
VEHICLE AXLE-WHEEL ASSEMBLY
Filed July 15, 1965

INVENTOR.
SEYMOUR F. JOHNSON
BY
*Harry R. Lubcke*
AGENT

United States Patent Office 3,321,232
Patented May 23, 1967

3,321,232
VEHICLE AXLE-WHEEL ASSEMBLY
Seymour F. Johnson, c/o Seymour F. Johnson Enterprises,
4748 Vieja Drive, Santa Barbara, Calif. 93105
Filed July 15, 1965, Ser. No. 472,087
9 Claims. (Cl. 295—37)

This invention pertains to an axle-wheel assembly for a vehicle and more specifically to such an assembly for railroad rolling stock, such as cars.

For a long time railroad car wheels have been pressed in pairs onto a solid metal axle, thus forming a fully integral assembly. Upon rounding a curve it is necessary that one wheel of the pair slip upon the rail. For a standard gauge railroad the outer rail is 355 inches longer than the inner rail for a complete circle of track. If the outer wheel on this curve were free to rotate independently of the inner wheel it would make 3.43 more turns for the usual 33 inch diameter freight car wheel. With present integral assemblies the two wheels must slide and scrape on the curve according to a pattern determined by the instantaneous distribution of the load of the car, condition of the track, the condition of each wheel tread, and other random factors. Moreover, to the extent that the pair of wheels are not exactly the same diameter where they bear upon the rails, one or the other wheel must slip to compensate for the situation, even on straight track. It is thus evident that the present car wheels slip and slide considerably in going along the track.

Besides causing undesirable wear on the wheels and rails, this situation has an important effect upon the tonnage that a given locomotive can pull, particularly on curves.

The load that a locomotive can haul largely depends upon the ruling grade and the sharpness of the curves on the route the train is to traverse. Since the curves have a severe effect, especially on grades, a given locomotive can haul a considerably larger load if the additional friction on the curves is eliminated. Alternately, the speed can be increased with a given locomotive, or a smaller one employed, if the other variables are held constant. Also, the reduction of wear on the rolling stock and on the track reduces maintenance and replacement costs.

The prior art has recognized this situation to some extent and has sought to remedy it by providing independently rotative wheels on short axles; or on bearings within the hub of each wheel, to allow rotation about an essentially fixed axle. It is understandable that such arrangements wear relatively quickly and that the wheels may even wobble, resulting in an impractical structure. Although independently rotative wheels have been proposed and tried, it is for this reason that the ruling structure in railroads today is still the solid assembly of wheels and axle of a century ago. Also, the trucks for the independently rotative wheels tend to be heavier and to have less strength than the known through axle construction.

The present invention overcomes all of these difficulties and retains the advantage of the through axle by employing two concentric axles extending substantially the whole distance between wheels, with additional (differential) bearings between the two at the extremities of each. One wheel is fastened rigidly to only one axle. It is supported at the journal of the axle adjacent to it and also at a long lever arm near the opposite journal of the assembly, through an additional bearing. This structure effectively prevents wobble.

The additional bearings revolve principally when the assembly is going around a curve. Thus, the wear upon them is small and the life of the assembly is very long. Because of slight differences in wheel diameter of a pair of wheels due to wear or other factors, there is also typically a slight amount of rotation on a straight track. This is preferable, since the positions of individual rollers in the additional bearings is thereby changed. In this way, Brinelling, or the formation of flat spots upon the rollers is prevented, as might occur with stationary bearings, due to the pounding on rail joints, switch frogs and the like.

At the present time, large and elaborate freight cars are being constructed to effect economies in operation and to cater to the particular needs of individual classes of shippers. As a consequence, the cost of such cars is typically three times greater than the cost of a standard car of equivalent type a few years ago. The reduction of friction according to this invention adds only a very small increment of cost to such new cars and results in a large increase in performance because of the large size of the cars. The use of the invention is thus in line with present railroad economics.

An object of this invention is to provide a differentially rotative pair of wheels on an axle assembly.

Another object is to provide such an assembly in which the wheels will not wobble after usual wear of the bearings involved.

Another object is to provide such an assembly in which the bearings and the wheel treads have a long life.

Another object is to provide such an assembly as is fail-safe.

Another object is to provide such an assembly which reduces friction between wheel tread and rail.

Another object is to provide such an assembly as is relatively simple, rugged and inexpensive.

Other objects will become apparent upon reading the following detailed specification and upon examining the accompanying drawings, in which are set forth by way of illustration and example certain embodiments of the invention.

Figure 1:
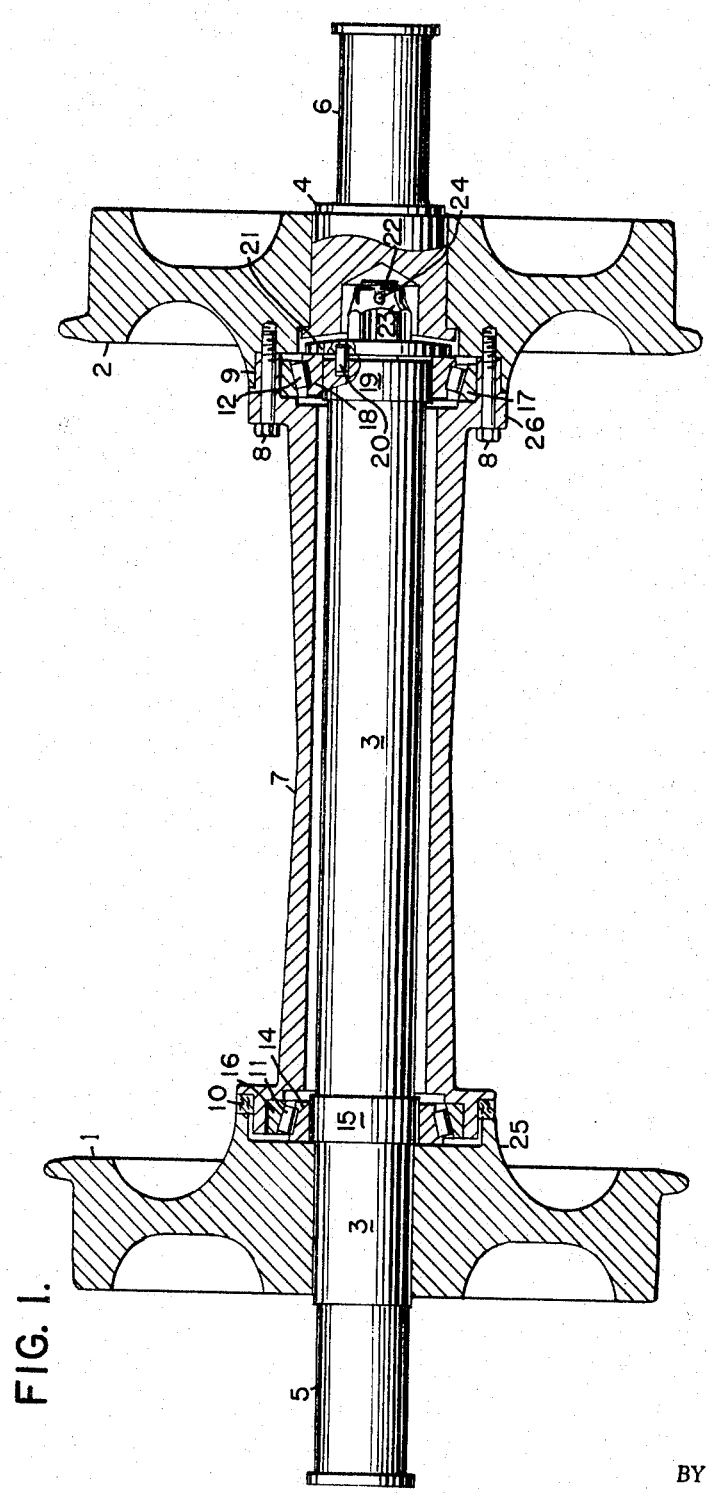
FIG. 1 shows a sectional elevation view of a complete axle-wheel assembly.

The axle-wheel assembly of FIG. 1 is suited for use in standard truck assemblies employing conventional journal bearings and standard wheels. It is possible to reconstruct the integral axle-wheel structure of the prior art into the differential assembly according to this invention by suitable machine work and additional parts, should this be desirable for sake of economy.

In FIG. 1, wheel 1 is pressed on the left end of axle 3 in the usual manner, as in a hydraulic press. Wheel 2 is similarly pressed onto short axle 4. Each axle is provided with a journal portion 5 and 6, respectively, adjacent to the position occupied by the wheel. The journals may fit into journal boxes (not shown) having sleeve bearings (brasses), or having roller bearings, as may be desired and in accordance with usual practice.

An outer hollow cylindrical axle 7 is attached by a plurality of cap screws 8 to wheel 2; the number of cap screws employed depending upon the load to be carried. Axle 7 thus becomes an extension of short axle 4. The joint between wheel 2 and axle 7 is machined and is preferably of reentrant configuration 9 to provide accuracy of centering. The opposite end of hollow axle 7 meets the hub of wheel 1, with a small gap into which grease retainer and dust seal ring 10 is fitted. The cross-section of hollow axle 7 may decrease from the extremities to the center thereof as shown to conform to the shape of known solid axles, although this is not necessary.

Combined thrust and radial load type rollers bearings 11 and 12 are the (additional) differential bearings according to this invention and may be of the typical tapered roller bearing type. It will be understood that separate load and thrust bearings of either ball, roller, or simple bronze types may be used in place of the shown and preferred combined bearings. It will be seen that these bearings do not take the direct load of the vehicle and that they revolve slowly in going around curves and even more slowly on straight track. For these reasons a very long life is to be expected of these differential bearings. Although accuracy and good fit is important to meet the usual requirements of good workmanship, the bearings per se need not be of the heavy duty type.

The inner race 14 and rollers of bearing 11 are pressed onto section 15 of increased diameter of axle 3 against the machined recess of wheel 1. The outer race 16 of bearing 11 and the outer race 17 of bearing 12 are pressed into appropriate cavities turned in each end of hollow axle 7. This subassembly is slipped over axle 3 and into position on bearing 11. Inner race 18 of bearing 12 is then pressed on axle 3 over section 19 thereof of increased diameter.

A small axial hole is provided in this end of axle 3 at section 19 and a steel locking pin 20 is placed therein. A washer 21 having a diameter slightly less than the outer diameter of inner race 18 is employed to fasten the two axle and wheel subassemblies together. An inner threaded extension 22 of axle 3 is provided, over which washer 21 slips. An axial hole is provided in washer 21 for locking pin 20. The purpose of this subassembly is to prevent washer 21 from rotating independently of axle 3. A nut 23 is employed to secure washer 21 to axle 3, which nut is locked by cotter pin 24 or other suitable locking device.

It is to be noted that adjustment of bearings 11 and 12 by nut 23 can be accomplished prior to the installation of wheel 2 and that subsequent wear can be compensated for by this adjustment. The installation of wheel 2 is completed by screwing home bolts 8, which may then be provided with a locking wire through holes in each of the heads.

It will be seen that when equal circumferential forces are exerted on the treads of both wheels 1 and 2, there will be no relative motion in either of bearings 11 or 12. However, when these forces are not equal, as by one wheel traveling farther around a curve than the other, then there will be relative motion at both bearings 11 and 12.

The long lever arm for preventing wobble of wheel 1 extends from the point of contact of that wheel with the rail to bearing 12, while the long lever arm for preventing wobble of wheel 2 extends from the point of contact of that wheel with the rail to bearing 11. As a result, the resultant of forces acting during the use of the axle-wheel assembly, including lateral forces against the rims of the wheels, is essentially the same as if this whole assembly were integral. The important advantage, of course, is the friction-saving differential action of the compound axle obtained according to the invention. Inwardly acting side thrusts are absorbed through bearing 11 and outwardly acting side thrusts are sustained through bolts 8, nut 23, washer 21 and bearing 12.

It will be understood that lubrication can be provided bearings 11 and 12 by packing these with long life grease during assembly. Alternately, lubrication may be successively provided through use of usual type grease fittings (not shown), suitably located in axle 7 or in the hubs of the wheels.

Since the mechanism of the differential axle according to this invention is resident largely in the axle elements, wheels 1 and 2 may be of the (rubber) cushioned type having cushioning elements in the web and/or rim of the wheels, if this is desired.

While the majority of applications for this axle and wheel assembly require journals 5 and 6 to be outboard of wheels 1 and 2, it will be understood that inboard journals may be provided surrounding the inner extensions 25 and 26 of the wheel hubs, which may be made axially longer and radially larger.

It will be appreciated with respect to the differential aspect of the structure described herein, that should bearing 11 and/or 12 freeze and no longer be in a condition to rotate, the whole assembly reverts back to the conventional integral wheels and axle.

Figure 2:
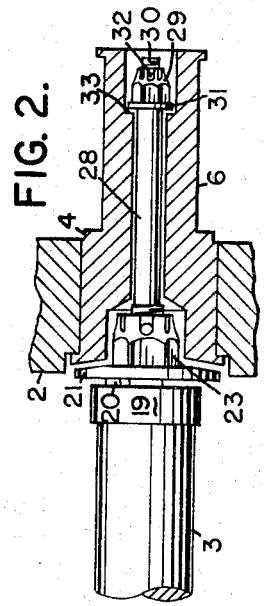
FIG. 2 shows a fragmentary sectional elevation view of an alternate construction having an additional safety feature.

FIG. 2 shows an alternate construction to provide a safety feature should nut 23 fail, as by stripping of the threads thereof.

Axle 3 is extended through journal 6, which is now made hollow, by extension 28. This extension may be an integral part of axle 3 or it may be a stud that is threaded and pinned into axle 3 in the vicinity of enlarged portion 19. An additional nut 29 is provided on extreme-end threaded portion 30 of extension 28, with a washer 31 and cotter pin 32. Nut 29 is tightened until washer 31 clears shoulder 33 within journal 6 by a small amount, such as 0.010 to 0.015 inch.

Figure 3:
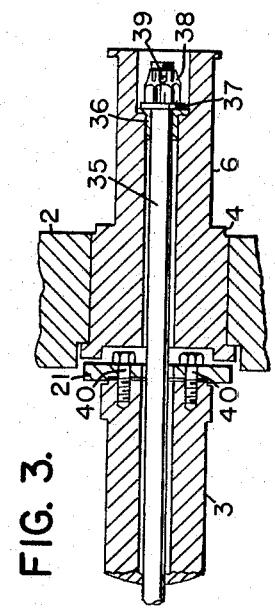
FIG. 3 shows a further fragmentary sectional elevation view of another alternate construction having additional safety features.

In FIG. 3 a further alternate safety construction is shown.

Axle 3 and axle 4 are both made hollow throughout their lengths and safety rod 35 is inserted therethrough. Bearing 36, which may be of the bronze type having an outer shoulder, is provided at the end of the hole in axle 4 within a terminating bored-out portion, and similarly at the end of the hole in axle 3 (not shown). Rod 35 is threaded at each end and a washer 37, nut 38 and cotter pin 39 are provided at each end. These parts are brought up together by nuts 38 to allow a slight amount of play between bearings 36 and washers 37. This allows the differential action of the two part axle to be obtained under normal functioning of bearings 11 and 12 (FIG. 1), but acts as with rod 35 as a safety tie to hold the whole assembly together should bolts 40 (FIG. 3) fail for any reason to retain washer 21 in place. Several bolts 40 take the place of single nut 23 (FIG. 1) in FIG. 3, passing through washer 21 and threading into axle 3. Only two of these bolts have been shown because of the particular sectional view. The heads of all are preferably wired together in the known manner.

Grease fittings, not shown, are provided to allow lubrication of bearing 36 and its counterpart bearing at the far left of axle 3, which bearing is not shown in the fragmentary view of FIG. 3.

Steel is the principal material used to fabricate this invention, being of the grades and types known to the trade.

Although this invention has been described in its preferred form as applied to railroad trucks and with a certain degree of particularity, it is to be understood that this disclosure of the preferred form has been made only by way of example, that other applications are possible, and that various changes in the details of construction and the proportions and combination and arrangement of parts may be made without departing from the spirit and scope of the invention as claimed below.

Having thus fully described this invention and the manner in which it is to be practiced, I claim:

1. An axle and wheel assembly comprising;
    (a) a first axle having a first journal, a first wheel, and a first bearing forming an integral structure in the order stated,
    (b) a second axle surrounding said first axle and having a second journal, a second wheel, and a second bearing forming an integral structure in the reverse order with respect to the order of these elements on said first axle,
    (c) first thrust-resisting means to cause said second bearing to bear upon said first axle, and to resist thrust inwardly between said wheels, and
    (d) second thrust-resisting means to cause said first bearing to bear upon said second axle, and to resist thrust outwardly between said wheels, whereby a differential force exerted between said first and second wheels causes rotation of said first axle with respect to said second axle at said second and said first bearings.

2. The assembly of claim 1 in which;
(a) said first and said second wheels have flanges to guide said assembly along spaced rails.

3. The assembly of claim 1 in which;
(a) said first and said second bearings are each formed to simultaneously carry radial and thrust loads.

4. The assembly of claim 1 in which;
(a) plural bolts pass through said second axle and said second wheel to form said integral structure between these two elements, and
(b) a radially disposed seal ring is disposed between said second axle and said first wheel.

5. The assembly of claim 1 in which there is additionally provided at the end of said first axle away from said first journal;
(a) threads upon said first axle,
(b) a washer surrounding said threads, and
(c) a nut engaging said threads and bearing upon said washer,
whereby said washer fixedly retains said second bearing.

6. The assembly of claim 5 in which;
(a) a pin is provided and axially disposed within holes in said first axle and said washer,
whereby said washer is prevented from rotating with respect to said first axle.

7. The assembly of claim 1 which additionally includes;
(a) a stud attached to said first axle and passing axially through said second journal, and
(b) a nut and a washer upon the extremity of said stud disposed with clearance with respect to said second journal to retain the whole said axle and wheel assembly together only should said second bearing become inoperative.

8. An axle and wheel assembly comprising;
(a) a first axle having a first journal, a first wheel, and a first bearing forming an integral structure in the order stated,
(b) a second axle surrounding said first axle and having a second journal, a second wheel, and a second bearing forming an integral structure in the reverse order with respect to the order of these elements on said first axle,
(c) means to cause said second bearing to bear upon said first axle, and
(d) means to cause said first bearing to bear upon said second axle,
whereby a differential force exerted between said first and second wheels causes rotation of said first axle with respect to said second axle at said second and said first bearings,
(e) a member passing within both said first axle and said second axle,
(f) a third bearing within said first journal,
(g) a fourth bearing within said second journal, and
(h) means upon each extremity of said member disposed with respect to both said third and fourth bearings to retain the whole said axle and wheel assembly together should either of said first or second bearings become inoperative.

9. An axle and wheel assembly comprising;
(a) a first axle having a first journal, a first wheel, and a first bearing forming an integral structure in the order stated,
(b) a second axle surrounding said first axle and having a second journal, a second wheel, and a second bearing forming an integral structure in the reverse order with respect to the order of these elements on said first axle,
(c) means to cause said second bearing to bear upon said first axle, and
(d) means to cause said first bearing to bear upon said second axle,
whereby a differential force exerted between said first and second wheels causes rotation of said first axle with respect to said second axle at said second and said first bearings,
(e) a rod passing concentrically through said first axle and said second axle,
(f) threads at each extremity of said rod,
(g) a bearing surrounding said rod within said first journal and within said second journal,
(h) a nut and a washer upon said threads at each extremity of said rod,
the recited structure proportioned to cause said washers to bear upon said bearings within said first and second journals upon said first or second bearings becoming loose.

References Cited by the Examiner
UNITED STATES PATENTS

| | | | |
|---|---|---|---|
| 106,635 | 8/1870 | Sturneyk | 295—37 |
| 199,208 | 1/1878 | Jones | 295—37 |
| 483,470 | 9/1892 | McLaren | 295—37 |
| 686,217 | 11/1901 | Fairbanks | 295—37 |
| 2,115,989 | 5/1938 | Hedgcock | 295—36 X |

References Cited by the Applicant
UNITED STATES PATENTS

| | | |
|---|---|---|
| 1,333,527 | 3/1920 | Yates. |
| 1,882,231 | 10/1932 | Oelkers. |
| 1,952,043 | 3/1934 | Backwalter. |
| 2,727,780 | 12/1955 | Lorig et al. |
| 2,784,998 | 3/1957 | Blackwood. |

ARTHUR L. LA POINT, *Primary Examiner.*
C. W. HAEFELE, *Assistant Examiner.*